United States Patent [19]

Nelson

[11] 4,289,021

[45] Sep. 15, 1981

[54] TONGS HAVING TORQUE INDICATOR THEREON

[75] Inventor: Paul M. Nelson, Houston, Tex.

[73] Assignee: Wilson Industries, Inc., Houston, Tex.

[21] Appl. No.: 67,181

[22] Filed: Aug. 16, 1979

[51] Int. Cl.[3] .......... G01L 5/24

[52] U.S. Cl. .......... 73/862.25

[58] Field of Search .......... 73/139 R; 81/52.5

[56] References Cited

U.S. PATENT DOCUMENTS

| | | | |
|---|---|---|---|
| 1,809,087 | 6/1931 | Watrous | 81/52.5 |
| 2,272,610 | 2/1942 | Kreiger et al. | 73/139 |
| 2,281,226 | 4/1942 | Boles | 73/139 |
| 2,527,456 | 10/1959 | Schmeling | 73/139 |
| 3,589,179 | 6/1971 | Nicolau | 81/52.5 |
| 3,970,155 | 7/1976 | Otto | 73/139 |
| 4,006,629 | 2/1977 | Barrett et al. | 73/139 |

*Primary Examiner*—Donald O. Woodiel

*Attorney, Agent, or Firm*—Arnold, White & Durkee

[57] ABSTRACT

A tongs having gripping jaws and a handle for applying an actuating force thereto is characterized by a sensing unit mounted in a force-receiving relationship with the handle. The sensing unit is responsive to a compression or tension force imposed thereon when an actuating force is applied to the handle to generate a signal functionally related to the magnitude of the actuating force. A readout device may be connected to the sensing unit and responsive to the signal generated therefrom to provide a visual indication in any predetermined units of the magnitude of the force imposed on the handle or the torque imposed by the jaws resulting therefrom.

7 Claims, 5 Drawing Figures

TONGS HAVING TORQUE INDICATOR THEREON

BACKGROUND OF THE INVENTION

1. Field of the Invention

This invention relates to tongs for making and breaking joints between adjacent threaded members and, in particular, to tongs having a sensing unit in a force-receiving relationship with respect thereto for generating a signal functionally related to the magnitude of the actuating force applied to the tongs.

2. Description of the Prior Art

In the hydrocarbon industry it is common practice to interengage threaded members in order to provide extended strings of drill pipe, production tubing, well casing, or wash pipe (depending upon the particular application). These interconnected strings of members may extend for several miles beneath the surface of the earth. In other instances it is often necessary to interengage relatively shorter assemblages of elements, for example, the engagement of sucker rods or the like or the assembly of a bottom hole survey apparatus.

The apparatus utilized to provide the torque necessary to assemble and disassemble ("make-up" or "break-out", respectively) the assembly of elements is known as a tongs. The tongs is a specific type of wrench which typically includes a set of jaws containing dies for grippingly engaging the exterior diameter of one adjacent member. The other member is held stationary with respect to the first member and an actuating force is applied to a tongs handle so that the necessary torque may be applied to the first member to make-up or break-out the threaded interconnection.

Manually operable tongs typically may contain two, three or more pivotally interconnected jaw members which may be closed into gripping engagement about a threaded member in anticipation of the application of a torque thereto. When the application of the force is completed the jaws are opened so as to permit removal of the tongs therefrom. The handle is the moment arm through which the force to effect the make-up or break-out of the threaded joint between the members may be applied. Usually, a chain, catline or the like links the end of the handle with the arrangement for generating the actuating force applied to the tongs. The manually operable tongs are typically suspended from a hanger or handle from suitable guy lines or the like disposed on the drilling installation.

Alternatively, there are arrangements known in the art as power tongs whereby the jaws are disposed in a housing circumferentially encompassing the bore opening and through which protrude the threaded members. This tongs arrangement is typically hydraulically operated and includes a tongs lift arrangement whereby the tongs are raised and lowered to a predetermined operating position about a horizontal datum at which the joint to be made-up or broken-out is located. One set of jaws, (the "back-up" jaws) is then moved radially inwardly into gripping engagement with one of the members while another set of jaws (the "driven" jaws) are moved into gripping engagement with the member which is to be rotated with respect to the first. A hydraulic tongs motor or the like applies the force which is used to effect the make-up or break-out of the joint between the adjacent threaded members.

In the case of both the manual and the power driven tongs it is advantageous to have some indication as to the magnitude of the torque applied to the threaded member. This indication has utility, for example, to prevent the application of excessive torque to the threaded member.

In the power tongs arrangement it is conventional to provide some feedback signal from the hydraulic tongs motor indicative of the amount of hydraulic pressure applied to the driven tongs. In the manually operable tongs a suitable tension meter or the like is affixed in the chain linking the end of the tongs handle to the force generating arrangement and obtaining an indication as to the magnitude of the force applied to the handle.

It will be observed, however, that both of the abovedescribed conventional methods are "indirect" in the sense that they provide an indication of the force applied to the end of the moment arm of the jaws distant from the end of that arm in proximity to the gripping jaws. In the particular instance of the manually operable tongs, the disposition of the sensing unit in the chain linkage may also be subject to errors or imprecision if the chain is not disposed perpendicularly to the axis of the handle. It will be recognized that such angulation provides a misreading of the force applied to the moment arm and any calculation of torque based thereon is commensurately imprecise.

It is believed to be advantageous to provide a tongs arrangement having a sensing unit disposed in a force-receiving relationship with the handle of the tongs (either manually operable or power driven tongs) in order that an indication of the magnitude of the torque applied to the tongs may be more accurately monitored.

SUMMARY OF THE INVENTION

This invention relates to a tongs for making or breaking joints between adjacent threaded members such as hollow tubular drill pipe, wash pipe, casing, or production tubing, or solid tubular members such as sucker rods or the like. The invention is useful in connection with any tongs having jaws adapted to grippingly engage one of the threaded members and further including a handle by which an actuating force is applied to the jaws to effect the making or the breaking of the joint between the members. In accordance with this invention, a sensing unit is mounted in a force-receiving relationship with respect to the handle and is operable to generate a signal functionally related to the actuating force applied to the handle to effect the making or breaking of the joint. The signal produced by the sensing unit may be applied to a suitable readout device and/or recording device which may be located in the handle and/or at a location distant therefrom. The recording device may be suitably calibrated such that a visual indication of the magnitude of the torque imposed by the tongs on the threaded member when a force is applied to the handle may be provided.

It is in accordance with this invention to dispose the sensing unit in a cut-out portion defined within the handle such that the application of a force to the handle imposes a compression or a tension force to the sensing unit. In the preferred embodiment the sensing unit is mounted in the force-receiving relationship to the handle at a location on the handle proximal to the tong jaws. In one embodiment of the invention, the handle may be formed from two pivotally interconnected members each having a recess defined therein, which recesses register to define the cut-out portion in the handle.

BRIEF DESCRIPTION OF THE DRAWINGS

The invention will be more fully understood from the following detailed description thereof taken in connection with the accompanying drawings, which form a part of this application and in which.

DESCRIPTION OF THE PREFERRED EMBODIMENT

Figure 1:
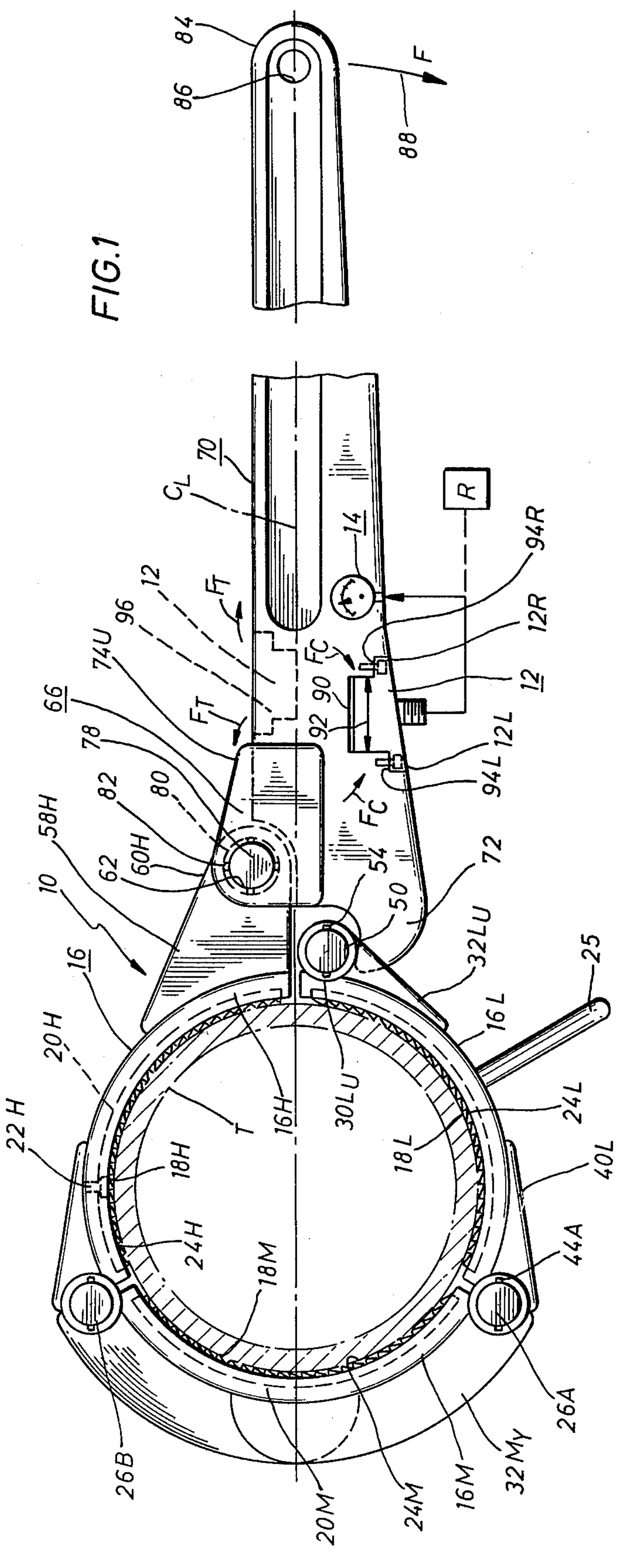
FIG. 1 is a plan view of a manually operable tongs having a torque sensing unit disposed in accordance with the teachings of the instant invention.

Throughout the following description similar reference numerals refer to similar elements in all figures of the drawings.

Figure 2:
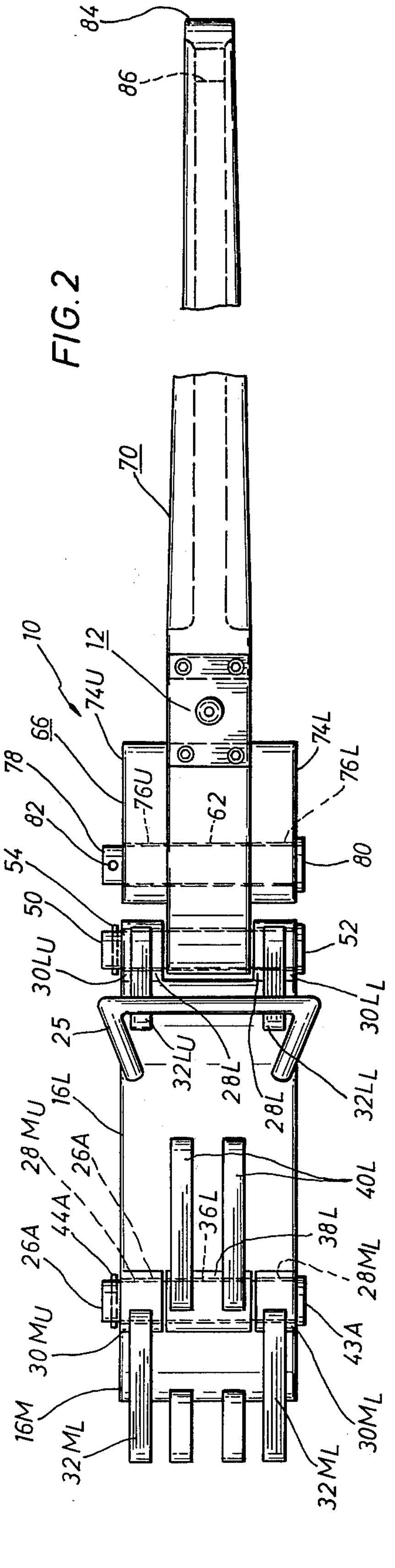
FIG. 2 is a side elevational view of the tongs shown in FIG. 1.

Referring first to FIGS. 1 and 2, respectively shown are a plan view and a side elevational view of a manually operable tongs generally indicated by reference numeral 10 in which a sensing unit indicated by reference numeral 12 is disposed in accordance with the instant invention. The sensing unit 12 may be mounted in a manner set forth herein in a compression or a tension relationship with the handle (as respectively shown in solid lines in FIGS. 1 and 3, and in the dot-dash lines in FIGS. 1 and 3) or the actuating lever, if a power tongs is used. A readout device 14 may be associated with the output of the sensing unit 12, as is also discussed herein.

The tongs 10 generally includes a jaw arrangement 16 pivotally interconnected as at 66 to a handle or actuating lever generally indicated by reference character 70. The jaws 16 includes a hinge jaw 16H, a middle jaw 16M and latch jaw 16L. Each of the jaws 16 has appropriate gripping dies 18H, 18M and 18L, respectively. The dies 18 are secured in recesses 20 defining within the jaws 16 by appropriate lock nuts 22 in a manner appreciated by those with skill in the art. The dies 18 each exhibit arrays of serrated teeth 24 which, when brought into contact with a threaded member T, grippingly engage the exterior surface of the same and transmit a torque thereto when an actuating force is applied to the handle. A jaw handle 25 may be provided to assist in opening and closing the tongs.

The jaws 16 are pivotally interconnected one with the other in an articulated arrangement by the provision of suitable linking pins which extend through the registered openings defined in interengaged ears and projecting lugs provided respectively on adjacent ones of the jaws.

For example, the latch jaw 16L is articulatedly linked to the middle jaw 16M by a hinge pin 26A. The hinge pin 26A is received by the registering central openings $28M_U$ and $28M_L$ respectively defined within upper and lower ears $30M_U$ and $30M_L$ supported on the middle jaw 16 by webs 32. The openings 28M register with an opening 36L provided in a projecting lug 38L supported from the latch jaw 16L by webs 40L. The hinge pin 26A has an enlarged head 43A and is secured in position by a cotter pin 44A. In a similar manner, the middle jaw 16M is articulatedly secured to the hinge jaw 16H by a hinge pin 26B. The end of the middle jaw 16M may be provided with ears similar to the ears 28 or a lug similar to the lub 36 with the hinge jaw 16H being provided with the appropriate elements in order to effect the pivotal interconnection of the middle jaw 16M with the hinge jaw 16H.

The latch jaw 16L is provided with ears $30L_U$ and $30L_L$ at the end thereof opposite the projecting lug 38L. The ears 30L are supported from the latch jaw 16L by webs $32L_U$ and $32L_L$. A latch pin 50 having an enlarged head 52 extends through openings 28L provided within the ears 30L. The latch pin 50 is secured in the openings in the ears 30L by a cotter pin 54.

The end of the hinge jaw 16H opposite the end thereof interconnected with the middle jaw 16M is provided with an elongated web 58H defining a projecting lug portion 60H having an opening 62H therein.

The handle 70 is an elongated member having a latch 72 disposed at one end thereof. The latch 72 is operative to engage the latch pin 50 and to thereby hold the constituent elements of the jaws 16 in substantially complete encirclement of the threaded member T. In FIGS. 1 and 2 the handle 70 is provided with a handle pin housing 74 having an upper element 74U and a lower element 74L cooperating to define ears which straddle the projecting portion 60H extending from the hinge jaw 16H. The handle pin housing elements 74 are provided with openings 76U and 76L which respectively register with the opening 62 provided in the projecting portion 60H to receive a handle pin 78. The handle pin 78 is provided with an enlarged head 80 and is secured in the registered openings 62 and 76 by a cotter pin 82.

It may be appreciated that the pinned interconnection between the handle pin 78 and the handle pin housing elements 74 and the projecting portion 60 cooperates to define the pivotal interconnection 66 defined between the jaws 16 and the handle 70.

The end 84 of the handle 70 distant from the pivotal interconnection 66 and from the latch 72 is provided with an opening 86 through which a suitable linking chain (not shown) may be inserted. The linking chain is operatively connected to a suitable actuating force generating arrangement (not shown) for rotating the latched jaws and the threaded member engaged thereby. The direction of the actuating force F is illustrated schematically in FIG. 1 by the reference arrow 88. It may be appreciated that application of the actuating force F to the handle 70 in the direction 88 generates a clockwise (as viewed in FIG. 1) rotation of the jaws 16 tending to correspondingly rotate the threaded member graspingly engaged by the dies.

In a power operated tongs, of course, the actuating force is usually provided by a fluid operator. The force is transmitted through an actuating lever to the jaws. The sensing unit may in accordance with this invention be disposed in the actuating lever to thereby provide a signal functionally related to the magnitude of the actuating force applied to the actuating lever. In this sense the term "handle" for a manual tongs is the functional equivalent of the "actuating lever" for a power tongs inasmuch as they are both members which transmit an actuating force to the jaws.

The magnitude of the torque (in foot-pound units) imposed upon the graspingly engaged member T by the application of an actuating force F acting in the direction 88 may be determined by a straightforward multiplication of the magnitude of the force F (in pounds units) by the length (in feet) of the moment arm defined by the length of the handle 70. If the moment arm is measured along the central axis $C_L$ of the handle 70 and if the central axis $C_L$ of the handle is coincident with a radius of the threaded member T grippingly engaged by the jaws 16, the magnitude of the torque imposed by the tongs 10 may be determined.

Those skilled in the art will readily appreciate that the description heretofore provided of the tongs 10 defines conventional tongs structure. It is to be understood, of course, that any structural modifications may be effected to the conventional tongs structure hereinbefore described without adversely impacting upon the utility of the invention so long as the resulting tongs structure exhibits a jaws arrangement whereby the threaded member grippingly engaged therewithin may be rotated in response to a force applied thereto through a handle or actuating lever.

It is believed to be advantageous for a variety of reasons to provide an accurate indication of the magnitude of the torque imposed upon the threaded member T grippingly engaged within the latched jaws 16. For example, it would be advantageous to have an indication as to the magnitude of the torque (or any other variable functionally related to the magnitude of the applied actuating force F) in order to insure that the torque (or other variable) being applied to a threaded member T lies within the acceptable levels for that member.

It is for that reason that the sensing unit 12 is disposed in accordance with the instant invention. The sensing unit 12 may include any suitable arrangement operable to generate a signal functionally related to the magnitude of the force F applied to the handle 70 of the tongs. For example, the sensing unit may take the form of a load cell responsive to the compression, tension, or a combination of both forces imposed thereon when the sensing unit is disposed in a force-receiving relationship with the handle 70. Believed suitable for use as the sensing unit are those devices manufactured by CEM Company and sold under the registered trademark Dillon. Another suitable load cell may be that manufactured by Houston Scientific International, Incorporated which is adaptable to measure loads or forces transmitted to the sensing unit within a predetermined range. Still other suitable sensing units which may be utilized in accordance with the instant invention are readily known to those skilled in the art. It is understood that any sensing unit operative to generate a signal functionally related to the magnitude of the actuating force F applied to the tongs handle 70 (whether directly or indirectly, or whether at the end 84 or any other point along the handle) lies within the contemplation of this invention. Of course, as further alternatives, a hydraulic transducer, an electrical transducer, or any other arrangement may be utilized as the sensing unit so long as that sensing unit, when mounted in a force-receiving relationship within the handle 70, generates an output signal functionally related to the magnitude of the force applied to the handle.

As seen in FIGS. 1 and 2, it is in accordance with this invention to provide the sensing unit 12 in a location proximal to the jaws 16 and adjacent the latch end of the handle 70 such that the signal output from the sensing unit 12 may be utilized to generate a representation of the magnitude of the torque applied to the threaded member in response to an actuating force imposed on the handle. In one embodiment of the invention shown in solid lines in FIGS. 1 and 2 the handle 70 is provided with a cut-out portion 90 of a predetermined axial dimension (measured with respect to the centerline $C_L$ of the handle 70), the axial dimension being illustrated by the reference character 92. The cut-out 90 communicates with mounting wing cut-outs 94L and 94R which are utilized to mount the sensing unit in the force-receiving relationship with the handle 70 as discussed in connection with FIG. 5.

It is apparent to those skilled in the art that, with the sensing unit 12 mounted in the force-receiving relationship illustrate in solid lines in FIGS. 1 and 2, the sensing unit 12 responds to a compressive force (acting in the direction of arrows $F_C$) imposed thereon when an actuating force F is imparted to the handle 70. However, other alternative dispositions of the sensing unit 12 may be utilized.

For example, as shown in dot-dash lines in FIG. 1 the sensing unit 12 may be disposed in a cut-out 96 disposed in the handle 70 such that the imposition of an actuating force F on the handle generates a tension force (acting in the direction of arrows $F_T$) which, when applied to the sensing unit 12 mounted in a force-receiving relationship with respect thereto, generates an output signal that is functionally related to the magnitude of the actuating force imposed thereon.

Figure 5:
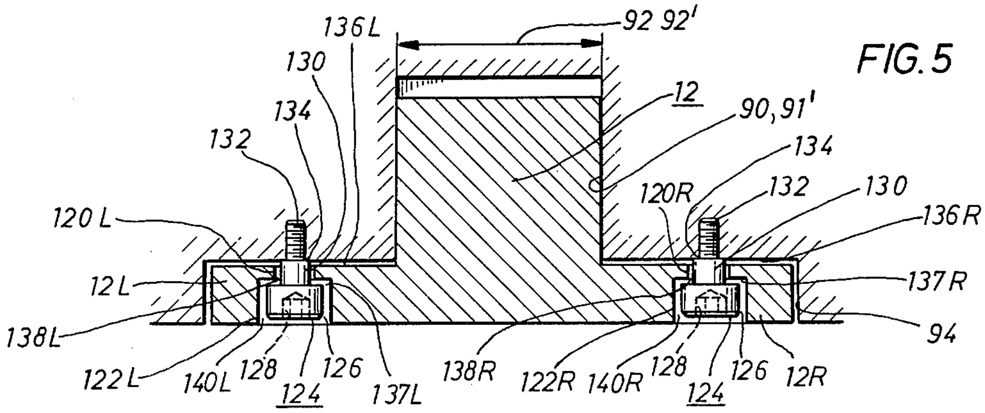
FIG. 5 is an enlarged view of the mounting arrangement whereby the sensing unit is disposed in a cut-out portion (defined either as in FIG. 1 or FIG. 3) in accordance with the instant invention.

As noted, a suitable mounting arrangement whereby the sensing unit 12 is mounted in the force-receiving relationship with respect to the handle 70 is shown in the enlarged view of FIG. 5. It is also understood that the tongs may be reversibly mounted so that an actuating force may be imposed in a direction opposite to the direction 88 of the force F without detracting from the instant invention.

It is within the contemplation of this invention to utilize the readout device 14 operatively connected to the output of the sensing unit 12 in order to preferably provide a direct visual or other sensory indication of the magnitude (in any predetermined units) of the force applied to the handle. This signal may conveniently be calibrated in foot-pounds to provide an indication (usually visual) of the magnitude of the torque imposed on the threaded member.

The readout may be remote from the tongs handle in which case the use of a suitable connecting cable in order to transmit the signals generated by the sensing unit 12 to the readout 14 must be provided. At the remote location, suitable display and/or recording equipment illustrated schematically as reference character R (FIG. 1) may be utilized. Of course, a readout may be disposed both on the handle and simultaneously at a remote location.

It is also within the contemplation of this invention to mount the readout device 14 directly on the handle of the tongs or at any other convenient location so that the operator of the tongs may be apprised of the magnitude of the torque imposed upon the threaded member.

Believed suitable for use as a remote readout device is a digital display arrangement such as that manufactured by Ametek, Control Division, Feasterville, Pa. A suitable on-tong readout device may be that manufactured by the same manufacturer. The readout devices, whether remote, on-tong, or both, may be calibrated in any convenient manner, and it is understood that the readout may represent any appropriate variable.

Figure 3:
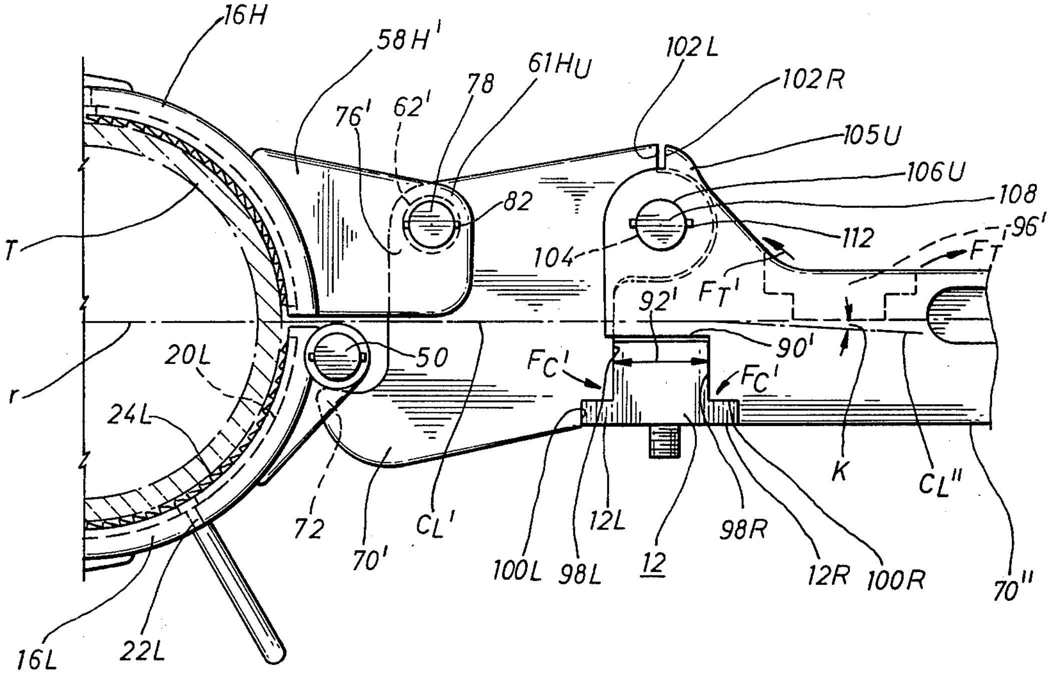
FIG. 3 is a plan view of a portion of a tongs having a two-piece pivotal handle cooperating to define a cut-out portion therein in which a sensing unit is disposed in accordance with the teachings of the instant invention.
Figure 4:
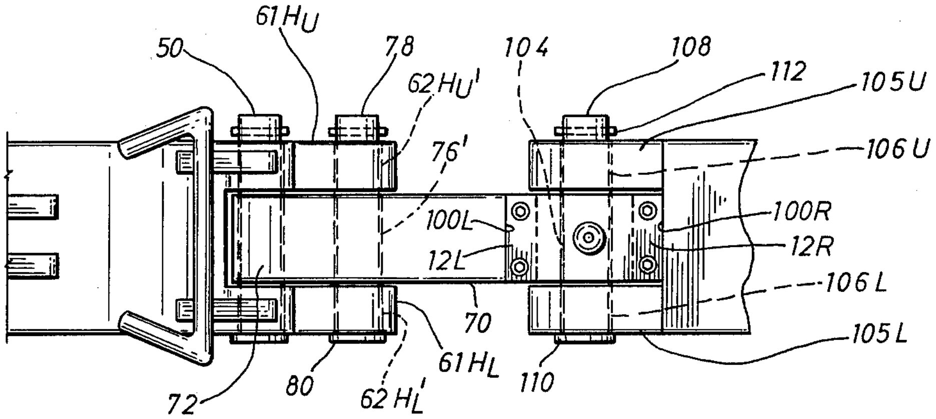
FIG. 4 is a side elevation view of a portion of the tongs shown in FIG. 3.

With reference now to FIGS. 3 and 4 shown is the manner in which a modified tong handle may be adapted to receive the sensing unit in accordance with the instant invention.

As seen in FIG. 3 the hinge jaw 16H has been slightly modified such that ears 61$H_U$ and 61$H_L$ (which ears 61 are similar to the ears 30L on the latch jaw 16L in FIG. 2) are defined at the end of the elongated web 58H′ provided on the hinge jaw 16H.

The handle includes a first portion 70′ which has an opening 76′ therein which, when registered with the openings 62$H_U'$ and 62$H_L'$ provided in the ears defined at the ends of the projecting webs 58H, receive the handle pin 78. The member 70′ includes the latch 72. At the end of the member 70′ opposite the latch 72 a cut-out 98L and a wing cut-out 100L (FIG. 3) are defined. At the same end of the member 70′ is provided an abutment shoulder 102L. In the vicinity of the abutment shoulder 102L is provided an opening 104.

The remaining portion 70″ of the handle 70 has ears 105U and 105L thereon. The ear 105U includes an abutment shoulder 102R which, in the assembled relationship shown in FIG. 3, faces the surface of the abutment shoulder 102L. Suitable openings 106U and 106L are provided in the ears 105 of the handle portion 70″ which when registered with the opening 104 provided in the member 70′ receive a suitable pivot pin 108. The pin 108 is provided with an enlarged head 110 and is held in position by a cotter pin 112. The portion 70″ of the handle 70 is also provided with a cut-out portion 98R and a wing cut-out 100R (FIG. 3) therein. It is appreciated that when the members 70′ and 70″ are disposed in their assembled relationship and snuggly secured one to the other by the provision of the pin 108 through the registered openings 104 and 106 the cut-outs 98L and 98R cooperate to define an opening 90′ (FIG. 3, similar to the cut-out 90 in FIG. 1). The opening 90′ has an axial length 92′ (FIG. 3, measured with respect to the centerlines $C_L'$ and $C_L''$) sized to accommodate the sensing unit 12.

When an actuating force F is imposed on the handle of FIGS. 3 and 4 (comprising the conjoined elements 70′ and 70″) the element 70″ pivots slightly with respect to the element 70′ about the pivot pin 108 and thereby imposes a compressive force $F_C'$ on the sensing unit 12. In such an occurrence, it may be appreciated that the centerline CL″ of the handle portion 70″ deviates slightly (by the angle K shown in FIG. 3) with respect to the centerline $C_L'$ of the handle portion 70′. It may also be the case that the centerline $C_L'$ slightly deviates from the radius r of the threaded member engaged by the jaws 16. When the actuating force F on the handle 70 is reversed, abutting action between the abutment surfaces 102L and 102R transmits an unlatching force to the latch 72 to thereby release that element from its latched interengagement with the latch pin 50. It should be appreciated that the element 70″ of the bipartite handle may also be modified (as at 96′, FIG. 3) to accept the sensing unit 12 such that a tension force $F_T'$ may be imposed thereon when the actuating force F is imposed upon the handle.

It should be appreciated that the clearances shown in FIG. 3 between the shoulders 102L and 102R as well as the magnitude of the deflection angle K are greatly exaggerated for clarity of illustration. In the preferred embodiment of the invention, these clearances and distances are preferably on the order of a few thousandths of an inch and would be practically imperceptible to an operator of the tongs. Moreover, the provision of the bipartite handle having elements 70′ and 70″ in no way detracts from the operating efficiency of the tongs but is shown to provide an illustration of the manner in which the sensing unit 12 may be disposed in accordance with the instant invention in a tong arrangement utilizing such a bipartite tongs handle.

With reference now to FIG. 5 shown is an enlarged horizontal sectional view of the manner in which the sensing unit 12 is mounted in a force-receiving relationship with the tongs handle. It is understood that the mounting arrangement shown in FIG. 5 is applicable to either the tongs handle disposed in FIGS. 1 and 2 (whether the sensing unit is disposed so as to respond to either the compression force $F_C$ or the tension force $F_T$) and in the bipartite tongs handle shown in FIGS. 3 and 4 (again whether the sensing unit responds to either the compression force $F_C'$ or the tension force $F_T'$).

The sensing unit 12 is provided with a housing having suitable wings 12L and 12R. The wings 12L and 12R are each provided with openings 120L and 120R having counterbores 122L and 122R communicating respectively therewith. The counterbores are sized to receive the heads 126 of shoulder bolts 124. The bolts 124 have suitable openings 128, as Allen-head openings, provided therewithin. Each shoulder bolt 124 includes a barrel portion 130 of a predetermined axial length. Projecting from the barrel portion 130 of each shoulder bolt is a threaded section 132.

In order to mount a sensing unit 12 in the force-receiving relationship with the cut-out 90 of the handle 70 or the cut-out 90′ (cooperatively defined by portions 98L in element 70′ and 98R in element 70″), a predetermined number of shoulder bolts 124 are inserted through a corresponding number of openings 120 provided in the wings 12L and 12R. The bolts are driven into the portion of the handle in the vicinity of the wing cut-outs (94 in FIGS. 1 and 2, 100L and 100R in FIG. 3) until the threaded portions 132 of the bolts 124 are driven into the material of the tongs handle such that the barrel portions 130 of each bolt 124 shoulder against the surface of the tongs handle, as at 134.

It is to be understood the axial length of the barrel portion 130 is selected so that when each bolt 124 is so disposed within the tongs handle a predetermined clearance 136 may be defined between the under surface of the wings 12L and 12R and the surface of the handle in the vicinity of the cut-outs, and a predetermined clearance 137 may be defined between the wings 12L and 12R and the underside of the heads of the bolts 124. Further, clearances 138 are defined between the openings 120 in the wings 12 and the outer diameter of the barrel 130. Clearances 140 are defined between the heads 126 of the bolts 124 and the counterbores 122 of the wings 12L and 12R.

It is to be emphasized that in FIG. 5 these clearance spaces are greatly exaggerated in order to clearly illustrate that when the sensing unit 12 is mounted in the force-receiving relationship with respect to the tongs handle 70 (FIGS. 1 and 2) or the tongs handle comprising elements 70′ and 70″ (FIGS. 3 and 4) the manner in which the unit is so mounted permits sufficient "breathing space" to be defined so that the unit 12 may move slightly laterally and toward or away from the handle. Thus, there is no extraneous bias imposed upon the sensing unit 12. In practice the clearances 136, 137, 138 and 140 are on the order of a few thousandths of an inch. It should be appreciated that in view of such a disposition no biasing forces are imposed on the sensing unit 12 by the mounting thereof into a force-receiving relationship with the tongs handle 70 (or 70' and 70'') so that the sensing unit 12 responds only to the imposition of forces (compression or tension) generated in the tongs handle when the actuating force F is applied thereto and that the signal generated from the sensing unit 12 is functionally related only to the magnitude of the actuating force F imposed upon the tongs handle 70 (or 70' and 70'').

In view of the foregoing it is clearly understood that in accordance with the instant invention a sensing unit is disposed in a force-receiving relationship with respect to a tongs handle such that the sensing unit generates a signal functionally related to the magnitude of the actuating force imposed on the tongs handle to effect the make-up or break-out of a joint between adjacent threaded members. It is within the contemplation of this invention to provide in cooperative association with the sensing unit 12 a readout device 14 responsive to the signal generated by the sensing unit 12 in order to provide a visual or other indication (calibrated in any applicable units) of the magnitude of the force imposed on the handle of the tongs. In the preferred embodiment, it is advantageous to dispose a readout device directly on the tongs handle to provide that readout so as to generate a visual indication of the amount of torque (in foot-pounds) imposed by the jaws to the threaded member T when an actuating force F is applied to the handle. The readout may also be provided separately or simultaneously at a remote location, with a recording device also possibly remotely located.

It is also within the contemplation of this invention to calibrate or otherwise "zero" the sensing unit and the readout (if one is provided) in any convenient manner. Those skilled in the art may also appreciate that in addition to the utilization of the sensing unit (with or without the readout) in connection with wash pipe tongs, casing tongs, drill pipe tongs, or production tubing tongs (recognized all as derrick uses for tongs), the invention may be advantageously disposed in any shop or field tool break-out unit with equal effect.

Having described the preferred embodiment of the invention those skilled in the art having benefit of the teachings hereinabove set forth may effect numerous modifications thereto which modifications remain in the contemplation of this invention as defined by the appended claims.

What is claimed is:

1. A tongs for making and breaking a joint between adjacent threaded members in oil field applications, comprising:

jaws for grippingly engaging one of the threaded members;

a handle by which an actuating force is applied to the jaws to effect the making or breaking of the joint, the handle having a cut-out portion therein, the cut-out portion being disposed in the extremity of the handle proximal the jaws;

a single sensing unit mounted within the cut-out portion in a force-receiving relationship with respect to the handle for generating a signal functionally related to the force applied to the handle to effect the making or breaking of the joint, the sensing unit being free to move slightly in a lateral direction both perpendicular to and parallel to the longitudinal axis of the handle and in a direction both forward and away from the handle; and a readout device responsive to the signal generated by the sensing unit for generating a visual indication in predetermined units representative of the magnitude of the actuating force applied to the handle.

2. Apparatus according to claim 1 wherein the sensing unit is mounted with respect to the handle such that the application of an actuating force to the handle imparts a compression force to the sensing unit, the sensing unit being responsive to the compression force to generate the signal functionally related to the magnitude of the actuating force applied to the handle.

3. Apparatus according to claim 1 wherein the sensing unit is mounted with respect to the handle such that the application of an actuating force thereto imparts a tension force to the sensing unit, the sensing unit being responsive to the tension force to generate the signal functionally related to the magnitude of the actuating force applied to the handle.

4. Apparatus according to claim 1 wherein the readout device is disposed on the handle.

5. Apparatus according to claim 1 wherein the readout device is disposed at a location remote from the handle.

6. Apparatus according to claim 1 wherein a second readout device is simultaneously disposed at a location remote from the handle.

7. Apparatus according to claim 6 further comprising a recording instrument operatively associated with the readout devices for recording the indication of the magnitude of the actuating force applied to the handle.

* * * * *

UNITED STATES PATENT AND TRADEMARK OFFICE

CERTIFICATE OF CORRECTION

PATENT NO. : 4,289,021

DATED : Sept. 15, 1981

INVENTOR(S) : Paul M. Nelson

It is certified that error appears in the above—identified patent and that said Letters Patent is hereby corrected as shown below:

Col. 4, Line 7 - "lub" should read -- lug --.

Signed and Sealed this

*Twenty-sixth* Day of *January 1982*

[SEAL]

*Attest:*

GERALD J. MOSSINGHOFF

*Attesting Officer* — *Commissioner of Patents and Trademarks*